United States Patent [19]
Raspotnik

[11] Patent Number: 5,832,090
[45] Date of Patent: Nov. 3, 1998

[54] RADIO FREQUENCY TRANSPONDER STORED VALUE SYSTEM EMPLOYING A SECURE ENCRYPTION PROTOCOL

[75] Inventor: William B. Raspotnik, Longmont, Colo.

[73] Assignee: HID Corporation, Irvine, Calif.

[21] Appl. No.: 513,646

[22] Filed: Aug. 10, 1995

[51] Int. Cl.⁶ .................................................. H04K 1/00
[52] U.S. Cl. ............................................ 380/24; 235/380
[58] Field of Search ...................... 380/24, 23; 235/380, 235/492; 364/408

[56] References Cited

U.S. PATENT DOCUMENTS

| | | | |
|---|---|---|---|
| 4,453,074 | 6/1984 | Weinstein | 235/380 |
| 4,910,774 | 3/1990 | Barakat | 380/23 |
| 5,128,997 | 7/1992 | Pailles et al. | 380/23 |
| 5,495,098 | 2/1996 | Pailles et al. | 235/492 |
| 5,559,887 | 9/1996 | Davis et al. | 380/24 |

FOREIGN PATENT DOCUMENTS

| | | |
|---|---|---|
| 0 299 826 A1 | 1/1989 | European Pat. Off. . |
| 0 316 689 A2 | 5/1989 | European Pat. Off. . |
| 0 409 701 A1 | 1/1991 | European Pat. Off. . |
| 0 621 570 A1 | 10/1994 | European Pat. Off. . |
| 0 671 712 A1 | 9/1995 | European Pat. Off. . |
| 41 19 924 A1 | 12/1992 | Germany . |
| 2 267 626 | 12/1993 | United Kingdom . |

*Primary Examiner*—David C. Cain
*Attorney, Agent, or Firm*—Rodney F. Brown

[57] ABSTRACT

An encryption method and stored value system comprising a host computer, a reader/writer that communicates with the host computer, and an RF transponder that communicates with the reader/writer. The transponder comprises a transponder chip having a memory with a plurality of memory sections, which encryption method protects data stored in the memory. The method provides a secure way to increase and decrease the value stored the transponder and to selectively write and data to and from the transponder.

11 Claims, 2 Drawing Sheets

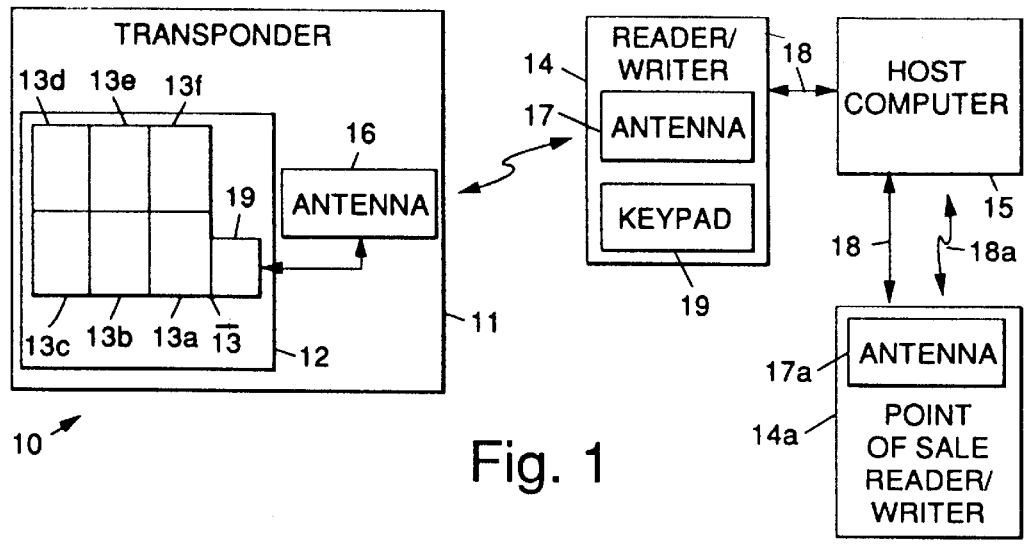
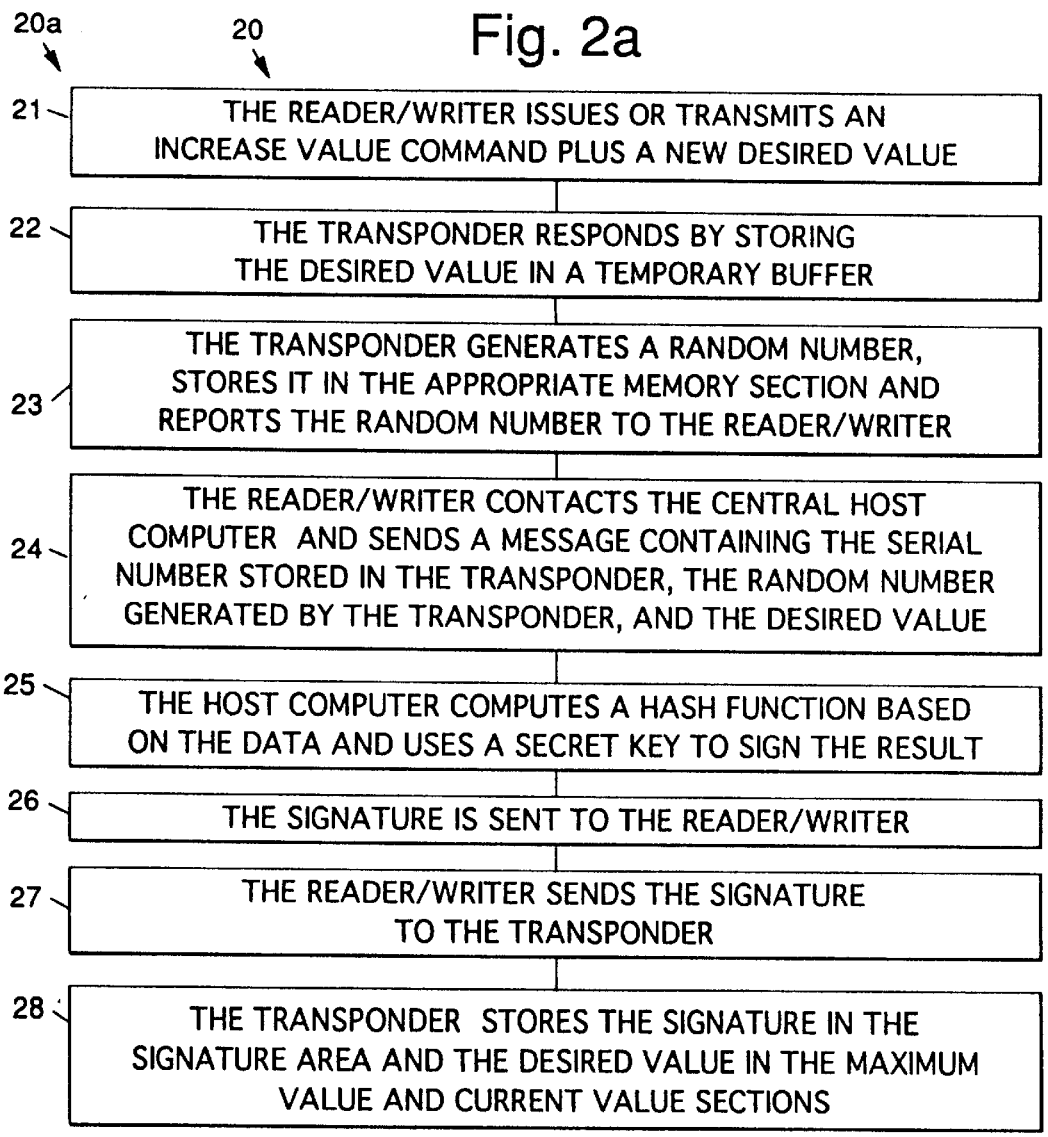

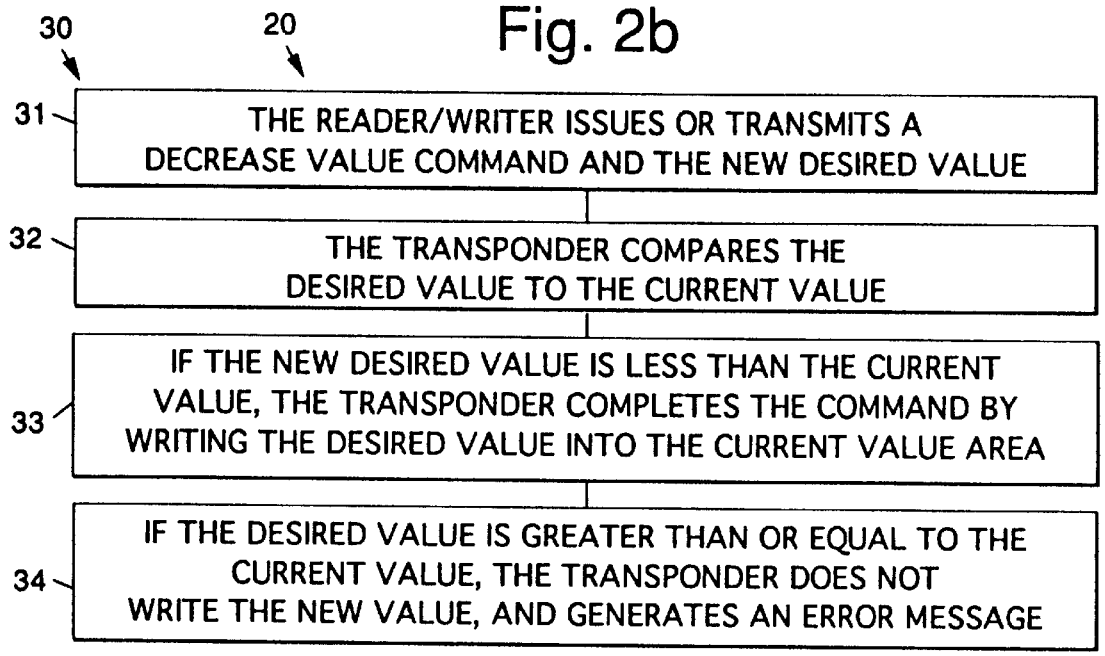
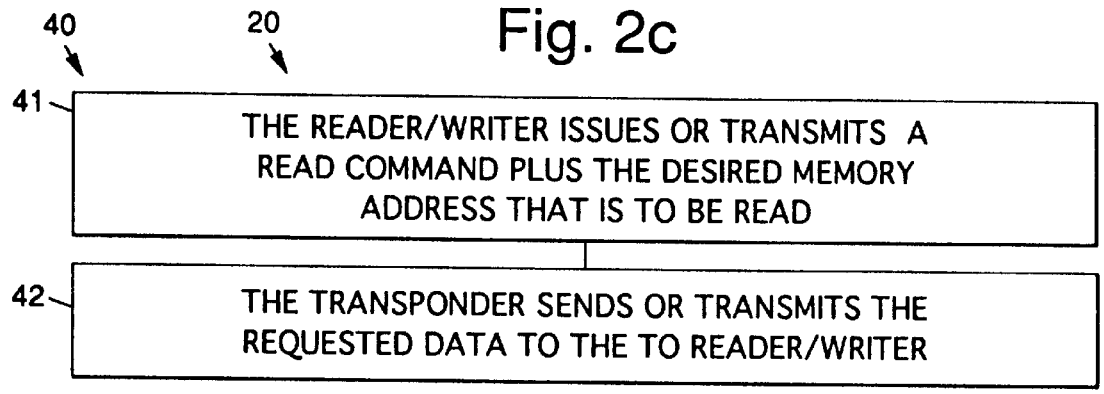
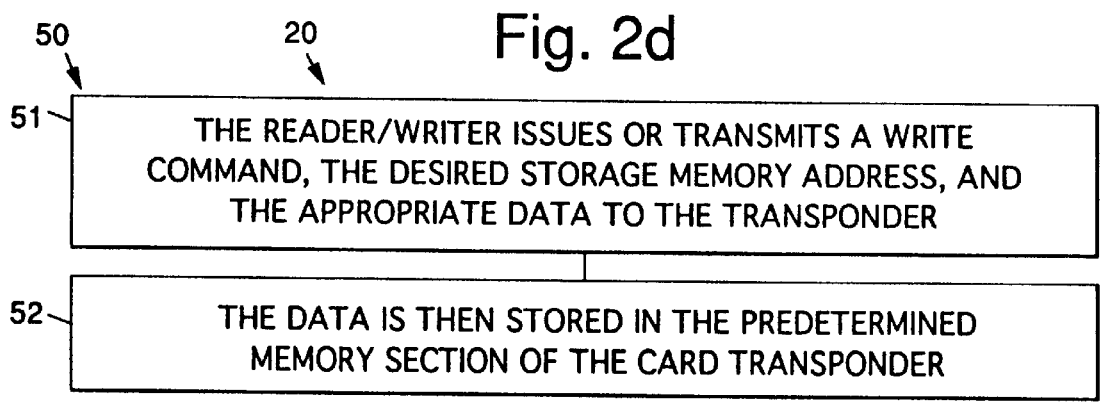

RADIO FREQUENCY TRANSPONDER STORED VALUE SYSTEM EMPLOYING A SECURE ENCRYPTION PROTOCOL

BACKGROUND

The present invention relates to stored value systems employing radio frequency transponders, and more particularly, to an encryption protocol and system architecture for use with such stored value systems.

Prior art relating to the present invention includes encryption algorithms such as public key encryption and random number generation. However, conventional transponders do not employ a system architecture and encryption protocol as is described herein.

There are several stored value systems currently in service that are based on magnetic stripe technology. One disadvantage of these systems is that it is easy to duplicate a magnetic stripe card, for example. As a result, the stored value system must implement complex algorithms to prevent fraud. These are discussed below.

The present invention is particularly suited to applications where money has been replaced by tokens or punch cards. For example, an application might be a mass transit bus system where a pass is purchased that is worth some number of rides. The issue is that the money replacement items (cards, tickets, tokens, etc.), now have a tangible value that can be counterfeited.

As a result, some effort has been put into making the money replacement items difficult to counterfeit. However, the problem is that in many cases minimizing the counterfeiting problem unduly complicates the system and makes it bothersome for the user. The reason that a money replacement system is used is that it is a more convenient way of accepting payment, and this should not be compromised by creating some elaborate scheme to prevent fraud.

In general, the money replacement items must have the following characteristics. (1) The replacement item must be capable of storing a value that can be increased or decreased. (2) The replacement item must be difficult to copy. (3) It must be difficult to increase the value of the replacement item. (4) The value of the replacement item must be easily read and verified. (5) It must be easy to accept payment for a service by decreasing the value of the replacement item.

Although the present invention may be used in many kinds of money replacement systems, it is particularly well suited to mass transit fare collection systems. For this application the conventionally used technology is a card with a magnetic stripe, where the magnetic stripe holds the value (stored either in dollars or number of rides) of the card. This technology fulfills the requirements 1, 4 and 5 above. It does an adequate job at requirement 3, but it falls down completely with requirement 2. Magnetic stripe readers and writers are readily available. To compromise this system, a counterfeiter simply purchases a card worth many rides, reads it and copies it at will. Although this is a large problem, some mass transit systems do use these cards. To prevent fraud, the system that reads the cards and controls the gates must be designed to discover duplicated cards and prevent their use. This is generally a difficult task and requires much time, effort and expense.

There are systems that have been postulated that would fulfill all 5 of the above requirements. In general, they rely on complex encryption protocols that require the money replacement item to have a great deal of computing power, such as micro-processor driven smart card technologies. The result is that these solutions are very expensive.

There are two parts of any encryption system. The first part is the method of encrypting the data. This is generally referred to as an encryption algorithm. The second part of the system is how the protected information is transferred and how the encryption algorithm fits into the system. This is generally referred to as an encryption protocol. The present invention relies on a widely known encryption algorithm known as public key encryption. What is unique about the present invention are the encryption protocol (i.e., how the encryption algorithm is used) and certain aspects of the transponder.

One feature of the transponder is its generation of a random number. In the present invention, there is an area of the transponder's memory that can only be written to by the transponder itself. The encryption protocol exploits this feature and public key encryption to produce a system that meets the 5 requirements outlined above.

Therefore, it is an objective of the present invention to provide for an encryption protocol and system architecture for use with stored value systems employing radio frequency transponders, and the like, that provides a solution to all five of the above requirements without the expense associated with providing complex computational power.

SUMMARY OF THE INVENTION

In order to meet the above and other objectives, the present invention is an encryption protocol (method) and architecture (system) that may be used in stored value systems that use radio frequency transponders. The present invention provides a system and method for transferring, updating, reporting, and testing the validity of information (values) stored in a memory of a transponder. The uniqueness of the present invention lies in the protocol or method and the associated transponder architecture or system that implements the protocol.

The system employs an RF transponder comprising a transponder chip including a memory having a plurality of memory sections that store data therein, and an RF antenna for transmitting and receiving commands and data. A reader/writer is provided for communicating with the transponder by way of an RF antenna. A host computer is provided for communicating with the reader/writer over a communications link, and for generating a secret key and a public key. The secret key is stored in the host computer and is used to generate validation signatures for changing data stored in the transponder. The public key is distributed to the reader/writer and is used to verify the signatures generated by the host computer. The system also includes point of sale reader/writers that are used in entrance gates, and vending machines, and the like, that are accessed by the transponder.

The memory in the transponder is divided into a plurality of memory sections, that respectively comprise a serial number section that stores a unique serial number for the transponder, an information section that stores non-value information, a current value section that stores the current (monetary or other) value of the transponder, a maximum card value section that stores the maximum possible value of the transponder that is set each time the value of a transponder is increased, a random number section that stores a random number that is generated by the transponder chip, and a signature section that stores the public key signature.

One aspect of the method comprises increasing the value of the transponder by transmitting an increase value command plus a new desired value for the transponder from the reader/writer to the transponder, storing the new value in a temporary memory buffer of the transponder, generating a random number in the transponder, storing the random number in the random number section of the memory, and transmitting the random number and the serial number stored in the transponder to the reader/writer, transmitting the serial number stored in the transponder, the random number generated by the transponder, and the new desired value from the reader/writer to the host computer, computing a hash function in the host computer based upon the serial number stored in the transponder, the random number generated by the transponder, and the new desired value using a secret key to generate a signature for the result, transmitting the signature from the host computer to the reader/writer, transmitting the signature from the reader/writer to the transponder, and storing the signature in the signature section of the memory and the new desired value in the maximum value section of the memory and the current value section of the memory of the transponder.

Another aspect of the method comprises decreasing a value stored in the transponder by transmitting a decrease value command and a desired decreased value from the reader/writer to the transponder, comparing at the transponder the desired decreased value to the current value stored in the transponder, writing the desired value into the current value section of the memory if the desired value is less than the current value, and generating an error message if the desired value is greater than or equal to the current value.

A further aspect of the method comprises selectively reporting data stored in predetermined memory sections of the transponder memory to the reader/writer by transmitting a read command from the reader/writer to the transponder and transmitting the requested data from the transponder to reader/writer. Yet another aspect of the method comprises selectively writing new data to an information section of the transponder by transmitting a write command plus appropriate data from the reader/writer to the transponder and storing the data in the predetermined memory section of the transponder.

The present method and system are designed for use with a secure stored value system, for example. With the present method and system, it is very difficult to counterfeit a stored value transponder. It is difficult to copy the contents of a valid transponder to another blank card and it is difficult to increase the value of a properly issued transponder. Since the stored value system can rely on the encryption protocol to provide protection against counterfeit transponders, it does not need the complex and expensive capabilities needed to prevent fraud. As a result the complexity of the stored value system may be greatly reduced.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 shows a transponder system that implements an encryption protocol in accordance with the principles of the present invention; and FIGS. 2a–2d are flow diagrams illustrating aspects of an encryption protocol in accordance with the principles of the present invention.

DETAILED DESCRIPTION

Referring to the drawing figures, FIG. 1 shows a transponder system 10 that implements an encryption protocol 20 in accordance with the principles of the present invention. There are three basic physical components of the transponder system 10. These include a transponder 11 comprising a transponder integrated circuit chip 12 that has a memory $\overline{13}$ comprising a plurality of memory locations 13a–13f or sections that store value and identification data, and an RF antenna 16 coupled to the transponder chip 12 that is used to transmit and receive the data. A reader/writer 14 communicates with the transponder 11 by means of an RF link comprising an RF antenna 17 and the RF antenna 16 in the transponder 11. The reader/writer 14 also includes a keypad 19 or other data entry device 19 that is used by a user to enter transactional data. The reader/writer 14 is used to issue transponders and to increase their respective monetary values, as will be described below. The system 10 also includes point of sale reader/writers 14a that are used in entrance gates, and vending machines, and the like, that are accessed by the transponder 11. The point of sale reader/writers 14a may have a keypad, depending upon their use. A central host computer 15 communicates with the reader/writers 14, 14a, typically by way of a hardwired communication link 18 or by means of an optional RF communications link 18a. The central host computer 15 is maintained by an appropriate transit authority. The authority would be whoever is responsible for the security of the stored value system. In the case of a fare collection application, the authority could be the company that controls the mass transit system. The central host computer 15 communicates with the reader/writers 14 in order to issue transponders 11. The host computer is not required (although it is useful) to be connected to the point of sale reader/writers 14a. Security for the system 10 is provided by the use of the public key encryption algorithm and the architecture of the present transponder 11.

The transit authority uses the public key encryption algorithm to generate a secret key/public key combination. The secret key is kept in the host computer 15 under control of the authority and is used to generate validation signatures. The public key is distributed to the reader/writers 14 in the system 10 and is used to verify the signatures generated by the host computer 15. The transponder 11 is designed so it is easy to decrease data values stored therein and difficult, without proper authority, to increase the data values stored therein.

As shown in FIG. 1, the memory $\overline{13}$ in the transponder 11 is divided into a plurality of memory sections 13a–13f, each with a specific purpose. The first section 13a is a serial number section 13a that stores a unique serial number for the transponder 11 that is written to once and is initialized at the time of manufacture. The second section 13b is an information section 13b that is used to store non-value related information required by the system 10, such as the date the transponder was issued, for example. The third section 13c is a current value section 13c that stores the current value of the transponder 11. The fourth section 13d is a maximum value section 13d that stores the maximum possible value of the transponder 11 that is set each time the value of a transponder 11 is increased. The fifth section 13e is a random number section 13e that stores a random number that is generated by the transponder chip 12. The sixth section 13f is a signature section 13f that stores a public key signature.

One unique aspect of the transponder 11 of the present invention is that he random number section 13e of the memory $\overline{13}$ can only be written to by the transponder itself. It is believed that this aspect of the present invention has not been employed in prior transponder systems.

The transponder 11 functions as follows and implements the encryption protocol 20 described below. The transponder chip 12 uses the memory sections 13a–13f discussed above to provide several functions in accordance with the encryption protocol 20. FIGS. 2a–2d are flow diagrams illustrating aspects of the encryption protocol or method 20 in accordance with the principles of the present invention.

Two functions provided by the method 20 and system 10 increase 20a and decrease 30 values stored in transponder 11. Commands that increase and decrease values stored in the transponder 11 are building blocks that provide system security in accordance with the encryption protocol 20.

Referring to FIGS. 1 and 2a, to increase 20a a value stored in the transponder 11, the following steps in the method 20 take place. The reader/writer 14 issues or transmits by way of the antenna 17 an increase value command plus a new or desired value for the transponder 11 (step 21). The transponder 11 responds by storing the new value in a temporary memory buffer 19 (step 22). The transponder 11 then generates a random number, stores the random number in the random number section 13e and reports both the random number and the unique serial number stored in the serial number section 13a to the reader/writer 14 (step 23). The reader/writer 14 contacts the central host computer 15 over the communications link 18 and sends a message containing the serial number stored in the transponder 11, the random number generated by the transponder 11, and the new desired value (step 24). The host computer 15 computes a hash function on the data and then uses its secret key and the public key encryption algorithm to take the result of the hash function as an input and generates a signature as an output (step 25). The signature is sent back to the reader/writer 14 (step 26). The reader/writer 14 sends the signature to the transponder 11 (step 27). The transponder 11 stores the signature in the signature section 13f and the new desired value in both the maximum value section 13d and the current value section 13c (step 28).

Referring to FIGS. 1 and 2b, to decrease 30 the value stored in the transponder 11, the reader/writer 14 issues or transmits a decrease value command and a new or desired value (step 31). The transponder 11 compares the desired value to the current value (step 32). If the desired value is less than the current value, the transponder 11 completes the command by writing the desired value into the current value section 13c (step 33). If the desired value is greater than or equal to the current value, the transponder 11 does not write the new value, and generates an error message (step 34) that is sent back to the reader/writer 14.

Other functions provided by the method 20 and system 10 also include reporting data 40 stored in the transponder 11 to the reader/writer 14, as is shown in FIGS. 1 and 2c. This function is straightforward. The reader/writer 14 issues and transmits (step 41) a read command to the transponder 11, which returns or transmits (step 42) the requested data by way of the RF link. All memory sections 13a–13f in the memory $\overline{13}$ may be read and transmitted to the reader/writer 14. The transponder 11 may also write new data 50 to the information section 13b of the memory $\overline{13}$, as is shown in FIG. 2d. This function is also straightforward. The reader/writer 14 issues and transmits (step 51) a write command plus the appropriate data and the transponder 11 stores (step 52) the data in the information section 13b of the memory $\overline{13}$.

By way of example, the features outlined above may be used to implement a secure fare collection system 10. There are two types of transactions performed by a user of this system 10. These are increasing the value stored in the transponder 11 and paying for a ride or other service. Each transaction is summarized below.

To increase the value stored in the transponder 11, as shown in FIG. 1, the user takes the transponder 11 to a ticket booth where the user prepays for services. The paid-in value is transferred to the transponder 11 using the increase value command described above. Each time the value of a transponder 11 is increased, the transponder 11 generates a new random number. Each increase transaction is processed by the host computer 15 and the signature generated by the host computer 15 acts as a validation stamp that confirms the authenticity of the transponder 11 and the data.

To pay for a ride (or other service), the reader/writer 14 at a point of sale is used to enforce security and decrease the value of the transponder 11. The sequence of events are as follows. The reader/writer 14 reads the information stored in the memory sections 13a–13f of the transponder 11. The reader/writer 14 then computes the same hash function as the host computer 15 based on the serial number, random number and maximum value stored in the transponder 11. The reader/writer 14 uses its copy of the public key derived from the host computer 15 to decrypt the signature received from the transponder 11. The decrypted signature must match the hash result the reader/writer 14 has computed. If it does not, the transponder 11 is considered fraudulent and the reader/writer 14 takes appropriate action, such as retaining the card or informing authorities, for example. If the signature matches, the transponder 11 is considered verified. As a second check, the reader/writer 14 compares the current value stored in the transponder 11 against the maximum value. If the current value is greater than the maximum value, the transponder 11 is considered fraudulent and the reader/writer 14 takes appropriate action. After the above two checks been passed, the reader/writer 14 accepts the card as valid and issues or transmits a decrease value command to the transponder 11. The reader/writer 14 then authorizes the transaction to take place. For example, this allows the user through the gate and onto a train or bus.

The system 10 remains secure despite the possibility of an attacker acquiring any combination of transponders 11 or reader/writers 14. In the above example, the attacker cannot increase the value of a transponder 11 because as soon as the transponder 11 receives an increase value command, it generates and stores a new random number. Until this new random number is signed by the host computer 15, the point of sale reader/writer 14 will not accept the transponder 11 as valid.

Thus there has been described a new and improved encryption protocol and system architecture for use with stored value systems employing radio frequency transponders, and the like. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A stored value system comprising:
   an RF transponder retainable by an individual public user comprising a transponder chip including a transponder memory that stores transponder data therein including a stored value, and an RF transponder antenna for transmitting the transponder data and receiving commands;
   a reader/writer physically accessible to a plurality of the individual public users for communicating with the transponder by way of the RF transponder antenna, including receiving the transponder data from the transponder and transmitting commands to the transponder;

a secure central host computer remotely positioned relative to the reader/writer and physically inaccessible to the plurality of individual public users for communicating with a plurality of the reader/writers, for transforming the transponder data and for generating a secret key, a public key, and an encrypted validation signature from the secret key and the transformed transponder data, wherein the central host computer includes a host computer memory for storing the secret key and the public key; and a communications link between the central host computer and the reader/writer for communicating the encrypted validation signature and public key from the central host computer to the reader/writer and for communicating the transponder data from the reader/writer to the central host computer, wherein the reader/writer includes means for transforming the transponder data, for decrypting the encrypted validation signature using the public key, comparing the decrypted validation signature to the transformed transponder data and transmitting a value change command for the stored value in response to a match between the decrypted validation signature and the transformed transponder data.

2. The stored value system of claim 1 wherein the memory in the transponder is divided into a plurality of memory sections, that respectively comprise a serial number section that stores a unique serial number for the transponder, an information section that stores non-value information, a current value section that stores a current value of the transponder, wherein the current value is the stored value, a maximum value section that stores a maximum possible monetary value of the transponder that is set each time the current value of the transponder is increased, a random number section that stores a random number that is generated by the transponder chip, and a signature section that stores the encrypted validation signature.

3. An method for increasing a stored value in a stored value system, the stored value system comprising a secure central host computer, a plurality of reader/writers that communicate with the host computer, and an RF transponder that communicates with the reader/writers and which comprises a transponder chip having a transponder memory, said method comprising:

transmitting an increase value command plus a new desired increased value for the transponder from one of the reader/writers to the transponder in response to input from an individual public user retaining the transponder and physically accessing the reader/writer;

storing the new desired increased value in a temporary memory buffer of the transponder;

generating a random number in the transponder, storing the random number in a random number section of the transponder memory, and transmitting the random number to the reader/writer;

transmitting the random number generated by the transponder, and the new desired increased value from the reader/writer to the host computer remotely positioned relative to the reader/writer and physically inaccessible to the individual public user;

computing a hash function in the host computer based upon the random number generated by the transponder, and the new desired increased value;

generating an encrypted signature for the result of the hash function using a secret key;

transmitting the encrypted signature from the host computer to the reader/writer;

transmitting the encrypted signature from the reader/writer to the transponder; and storing the encrypted signature in a signature section of the transponder memory and the new desired increased value in a maximum value section of the transponder memory and a current value section of the transponder memory.

4. The method of claim 3 further comprising:

transmitting a decrease value command and a desired decreased value from the reader/writer to the transponder;

comparing at the transponder the desired decreased value to a current value stored in the transponder memory;

writing the desired decreased value into the current value section of the transponder memory if the desired decreased value is less than the current value; and generating an error message if the desired decreased value is greater than or equal to the current value.

5. The method of claim 3 further comprising:

transmitting a read command from the reader/writer to the transponder; and selectively transmitting data stored in a predetermined section of the transponder memory from the transponder to the reader/writer in response to the read command.

6. The method of claim 3 further comprising:

transmitting a write command plus appropriate data from the reader/writer to the transponder; and storing the appropriate data in a predetermined section of the transponder memory.

7. The method of claim 4 further comprising:

transmitting a read command from the reader/writer to the transponder; and selectively transmitting data stored in a predetermined section of the transponder memory from the transponder to the reader/writer in response to the read command.

8. The method of claim 4 further comprising:

transmitting a write command plus appropriate data from the reader/writer to the transponder; and storing the appropriate data in a predetermined section of the transponder memory.

9. The stored value system of claim 1, wherein the transponder includes a random number generator for generating a random number and the random number is included in the transponder data received by the reader/writer, communicated to the host computer via the communications link and used in a transformed format to generate the encrypted validation signature.

10. The stored value system of claim 9, wherein the plurality of memory sections includes a random number section that stores the random number and the random number section is only writeable to by the transponder.

11. The method of claim 3, wherein the random number section of the transponder memory is only writeable to by the transponder.

* * * * *